US008736922B2

(12) United States Patent
Ohara

(10) Patent No.: US 8,736,922 B2
(45) Date of Patent: May 27, 2014

(54) IMAGE READING APPARATUS, IMAGE FORMING APPARATUS AND COMPUTER-READABLE MEDIUM

(75) Inventor: Kensuke Ohara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 88 days.

(21) Appl. No.: 13/370,787

(22) Filed: Feb. 10, 2012

(65) Prior Publication Data

US 2013/0070316 A1 Mar. 21, 2013

(30) Foreign Application Priority Data

Sep. 20, 2011 (JP) ................................. 2011-204866

(51) Int. Cl.
*H04N 1/04* (2006.01)
(52) U.S. Cl.
USPC ........... 358/475; 358/509; 358/474; 358/406; 399/168; 345/99
(58) Field of Classification Search
CPC ...... G01J 1/42; G01J 1/4204; G06K 7/10851; G09G 3/22; G09G 3/3406; G09G 3/342; G02F 1/00; H04N 1/00997; H04N 1/00087; H04N 1/00816; H04N 1/02815; H04N 1/60; H04N 1/00755; H04N 1/00779; H04N 1/00933; H04N 1/40012
USPC ......... 358/474, 475, 509, 486, 498, 518, 513, 358/465, 521; 399/130, 153, 168, 191; 345/99
See application file for complete search history.

(56) References Cited

U.S. PATENT DOCUMENTS

| | | | | |
|---|---|---|---|---|
| 5,491,330 A * | 2/1996 | Sato et al. | ............... | 250/214 AL |
| 6,963,429 B2 * | 11/2005 | Suzuki et al. | ................. | 358/474 |
| 6,989,918 B2 * | 1/2006 | Haas et al. | .................... | 358/487 |
| 7,071,979 B1 * | 7/2006 | Ohtani et al. | ................. | 348/269 |
| 7,495,810 B2 * | 2/2009 | Shiraishi | ........................ | 358/474 |
| 7,499,201 B2 * | 3/2009 | Kodama et al. | ............... | 358/474 |
| 7,852,530 B2 * | 12/2010 | Razavi | .......................... | 358/509 |
| 7,952,770 B2 * | 5/2011 | Ikeno et al. | ................... | 358/461 |
| 7,969,622 B2 * | 6/2011 | Saika | ............................. | 358/475 |
| 8,035,865 B2 * | 10/2011 | Ishido et al. | .................. | 358/449 |
| 8,111,433 B2 * | 2/2012 | Nagasaka | ...................... | 358/461 |
| 8,238,002 B2 * | 8/2012 | Inada et al. | .................... | 358/509 |
| 8,238,992 B2 * | 8/2012 | Soika et al. | .................... | 505/232 |
| 8,305,652 B2 * | 11/2012 | Honda et al. | .................. | 358/474 |

(Continued)

FOREIGN PATENT DOCUMENTS

JP 2005-51566 A 2/2005

*Primary Examiner* — Negussie Worku
(74) *Attorney, Agent, or Firm* — Sughrue Mion, PLLC

(57) ABSTRACT

An image reading apparatus includes a reading unit, a controlling unit and a changing unit. The reading unit receives a reflected light from a sheet onto which a light is irradiated from a light source, converts the received light into an image signal, and accumulates a charge corresponding to the image signal in accordance with a reading time of the sheet. The controlling unit controls the light source to be turned off in accordance with a reading mode of the sheet so that an amount of the accumulated charge does not reach a saturated amount. The changing unit changes an amplification factor of an amplifying unit in accordance with a turn-off time of the light source to amplify the image signal to a predetermined level when the controlling unit controls the light source to be turned off. The amplifying unit amplifies the image signal at a predetermined amplification factor.

8 Claims, 9 Drawing Sheets

(56) References Cited

U.S. PATENT DOCUMENTS

| | | | |
|---|---|---|---|
| 8,384,967 B2* | 2/2013 | Shinkawa | 358/475 |
| 8,482,823 B2* | 7/2013 | Cheng | 358/505 |
| 8,488,219 B2* | 7/2013 | Mikami | 358/475 |
| 8,503,047 B2* | 8/2013 | Shirado | 358/475 |
| 8,520,271 B2* | 8/2013 | Nishio | 358/475 |
| 8,559,072 B2* | 10/2013 | Takeuchi | 358/475 |
| 2005/0024246 A1 | 2/2005 | Fujihara et al. | |
| 2013/0010338 A1* | 1/2013 | Tanaka et al. | 358/475 |

* cited by examiner

IMAGE READING APPARATUS, IMAGE FORMING APPARATUS AND COMPUTER-READABLE MEDIUM

CROSS-REFERENCE TO RELATED APPLICATION

This application is based on and claims priority under 35 USC 119 from Japanese Patent Application No. 2011-204866 filed Sep. 20, 2011.

BACKGROUND

Technical Field

The present invention relates to an image reading apparatus, an image forming apparatus and a computer-readable medium.

SUMMARY (1) According to an aspect of the invention, an image reading apparatus includes a reading unit, a controlling unit and a changing unit. The reading unit receives a reflected light from a sheet onto which a light is irradiated from a light source, converts the received light into an image signal, and accumulates a charge corresponding to the image signal in accordance with a reading time of the sheet. The controlling unit controls the light source to be turned off in accordance with a reading mode of the sheet so that an amount of the charge accumulated by the reading unit does not reach a saturated amount. The changing unit changes an amplification factor of an amplifying unit in accordance with a turn-off time of the light source so as to amplify the image signal to a predetermined level when the controlling unit controls the light source to be turned off. The amplifying unit amplifies the image signal at a predetermined amplification factor.

BRIEF DESCRIPTION OF THE DRAWINGS

Exemplary embodiments of the invention will be described in detail based on the following figures, wherein.

DETAILED DESCRIPTION

Hereinafter, embodiments of the present invention will be described with reference to the accompanying drawings.

Figure 1:
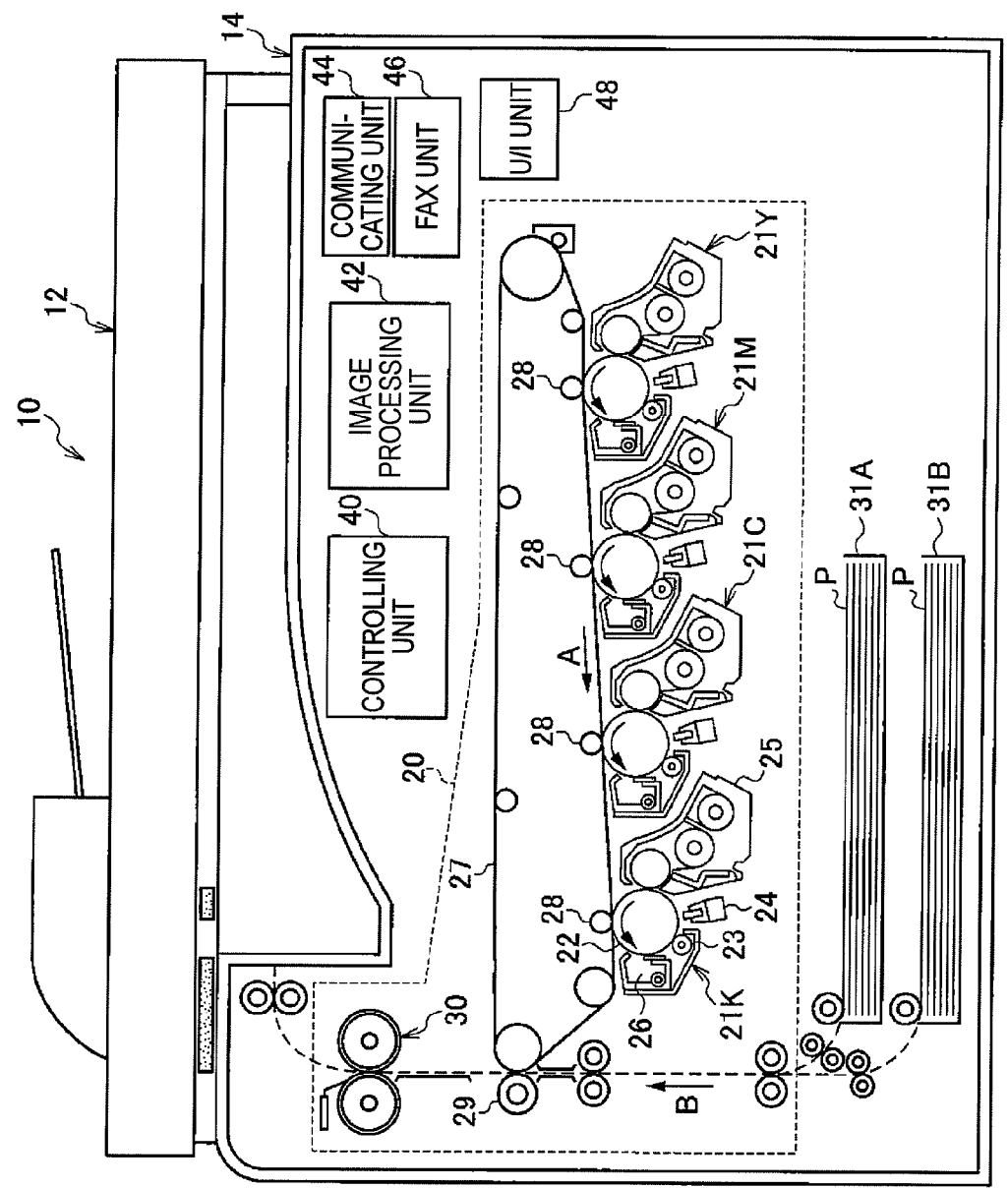
FIG. 1 is a schematic configuration illustrating an overall configuration of an exemplary image forming apparatus according to an embodiment of the present invention.

An image forming apparatus according to an embodiment of the present invention will be schematically described with reference FIG. 1. FIG. 1 illustrates an overall schematic configuration of an exemplary image forming apparatus according to the present embodiment.

Referring to FIG. 1, an image forming apparatus 10 according to the present embodiment is an all-in-one functional apparatus including a copy function, a print function, a facsimile function, or the like. The image forming apparatus 10 includes an image reading apparatus 12 and an image forming apparatus unit 14.

First, the image forming apparatus unit 14 will be described. The image forming apparatus unit 14 includes an image forming unit 20 configured to form an image on the basis of image data of each color, a controlling unit 40 configured to control an overall operation of the image forming apparatus 10, and a communicating unit 44 configured to receive image data from an external device such as a PC through a network such as, for example, a Local Area Network (LAN), a Wide Area Network (WAN), and the Internet. The image forming apparatus unit 14 further includes a facsimile (FAX) unit 46 configured to transmit/receive image data through a public line, an image processing unit 42 configured to perform a predetermined image processing operation on image data received from the image reading apparatus 12, the communicating unit 44, or the like. The image forming apparatus unit 14 also includes a user interface (U/I) unit 48 configured to receive an instruction from a user or provide information about image reading and image forming to the user.

The image forming unit 20 is a functional unit configured to form an image by, for example, an electrophotographic method, and includes four image forming units 21Y, 21M, 21C and 21K (hereinafter, collectively referred to as an image forming unit 21) arranged in parallel. Each image forming unit 21 includes, for example, a photosensitive drum 22 configured to form an electrostatic latent image and retain a toner image, a charger 23 configured to charge the surface of the photosensitive drum 22 to a predetermined potential, a print head 24 configured to expose the photosensitive drum 22 charged by the charger 23 on the basis of image data, a developer 25 configured to develop an electrostatic latent image formed on the photosensitive drum 22, and a cleaner 26 configured to clean the surface of the photosensitive drum 22 after the electrostatic latent image transferring.

The image forming unit 20 further includes an intermediate transfer body 27 configured to multi-transfer each color toner image formed at the photosensitive drum 22 of each image forming unit 21, a primary transfer roller 28 configured to sequentially transfer (primary transferring) each color toner image formed by each image forming unit 21 to the intermediate transfer body 27, a secondary transfer roller 29 configured to collectively transfer (secondary transferring) a toner image transferred and superimposed on the intermediate transfer body to a recording material (recording paper P), and a fixer 30 configured to fix the secondarily transferred image onto the recording paper P.

The image forming unit 21 of the image forming unit 20 forms yellow (Y), magenta (M), cyan (C) and black (K) color toner images by an electrophotographic method. The respective color toner images formed by the image forming unit 21 are sequentially and electrostatically transferred by the primary transfer roller 28 on the intermediate transfer body 27, so that the respective color toners are superimposed to form a combined toner image. The combined toner image on the intermediate transfer body 27 is conveyed to a region where the secondary transfer roller 29 is located according to the movement of the intermediate transfer body 27 (in the direction of an arrow A of FIG. 1), so that the combined toner image is collectively and electrostatically transferred on the recording paper P fed from paper receiving units 31A and 31B (in the direction of an arrow B of FIG. 1). Thereafter, the combined toner image transferred electrostatically on the recording paper P is fixed by the fixer 30 onto the recording paper P.

Figure 2:
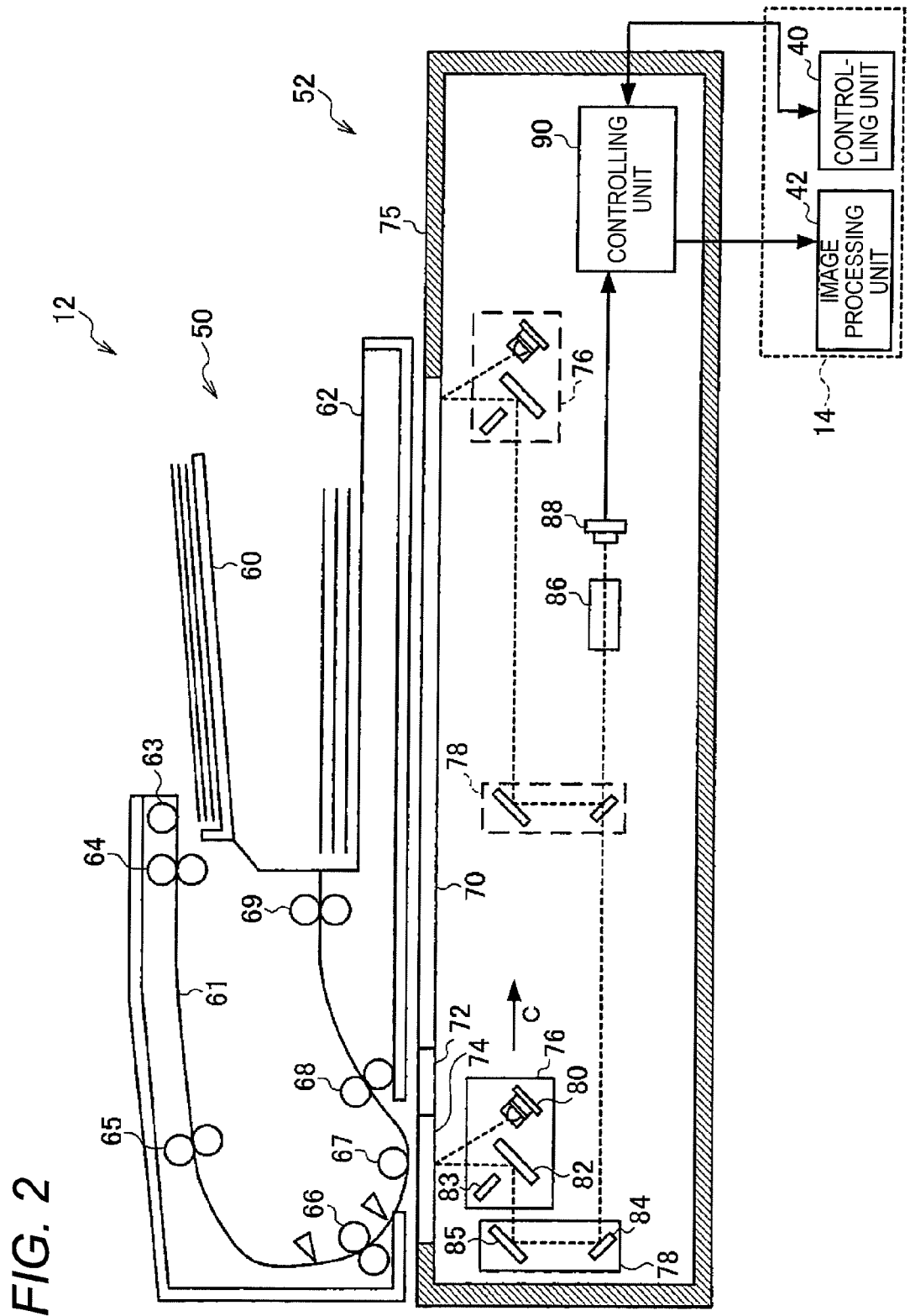
FIG. 2 is a schematic configuration illustrating an exemplary image reading apparatus according to the present embodiment.

Next, the image reading apparatus 12 will be described with reference to FIG. 2. FIG. 2 illustrates a schematic configuration of an exemplary image reading apparatus of the present embodiment. Referring to FIG. 2, the image reading apparatus 12 includes an automatic sheet feeding unit 50 and an image reading processing unit 52 configured to read an image formed on the surface of a sheet.

The automatic sheet feeding unit 50 includes a sheet table 60 on which at least one sheet of document is placed, a sheet conveying path 61 configured to convey a sheet, and an ejection table 62 onto which a sheet is ejected after image reading.

The sheet conveying path 61 is formed in a U-shape. A paper delivering roller 63, a delivering roller 64, a pre-registration roller 65, a registration roller 66, a platen roller 67, an outer roller 68, and an ejecting roller 69 are installed around the sheet conveying path 61. In a sheet feeding mode, the paper delivering roller 63 descends and picks up a sheet placed on the sheet table 60. The delivering roller 64 delivers the uppermost sheet among the sheets delivered from the paper delivering roller 63, to the inside. The pre-registration roller 65 temporarily stops a sheet delivered from the delivering roller 64, and performs inclination correction. The registration roller 66 temporarily stops a sheet delivered from the pre-registration roller 65, and adjusts read timing. The platen roller 67 makes a sheet, which has passed through the sheet conveying path 61, to be confronted with a second platen glass 74. The outer roller 68 and the ejecting roller 69 discharge a read-out sheet onto the ejection table 62.

The image reading apparatus 12 of the present embodiment includes a function for skimming the surface of a sheet fed from the sheet table 60 by the automatic sheet feeding unit 50, and a function for reading the surface of a sheet placed on a first platen glass 70.

The image read processing unit 52 of the present embodiment includes a CCD image sensor 88 and a controlling unit 90 in a case 75. In the case 75, the image reading apparatus 12 includes a full-rate carriage 76 configured to read an image while stopping at the reading position of the second platen glass 74 or scanning across the entire first platen glass 70, and a half-rate carriage 78 configured to guide light obtained from the full-rate carriage 76 to the CCD image sensor 88.

As illustrated in FIG. 2, the first platen glass 70, a white reference plate 72, and the second platen glass 74 are installed at the side of the case 75 opposite to the automatic sheet feeding unit 50. Herein, an image reading target sheet is placed on the first platen glass 70, and the second platen glass 74 serves as an opening for irradiating light onto a sheet to read the sheet being conveyed by the automatic sheet feeding unit 50.

The full-rate carriage 76 includes an illuminating unit 80 which includes a light source configured to irradiate light onto a sheet, a diffusive reflecting member 83 configured to diffusively reflect the light output from the illuminating unit 80 toward a sheet surface, a first mirror 82 configured to reflect the reflected light obtained from the sheet surface toward the half-rate carriage 78.

The half-rate carriage 78 includes a second mirror 85 and a third mirror 84 configured to guide the light obtained from the full-rate carriage 76 to the CCD image sensor 88.

Figure 3:
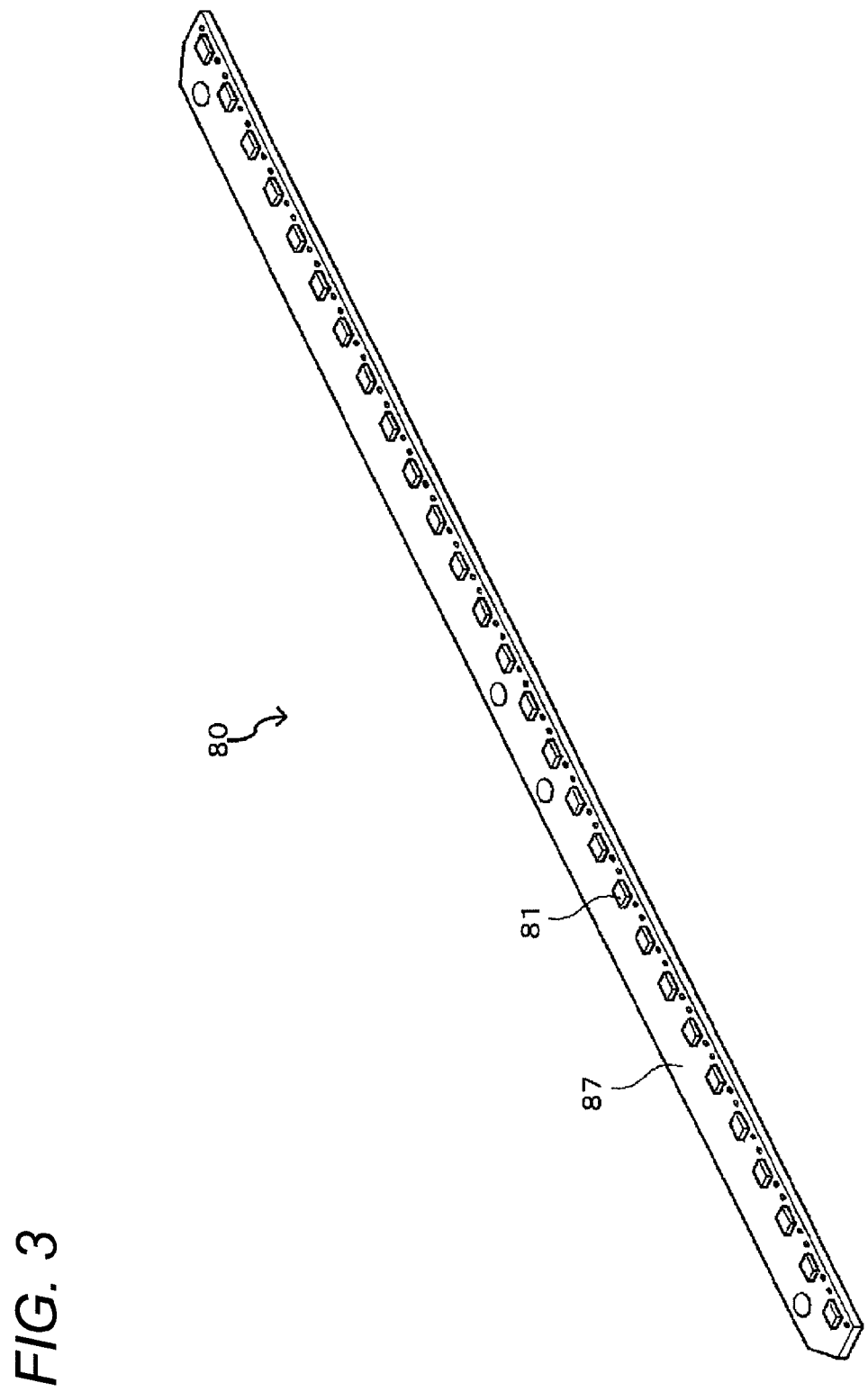
FIG. 3 is a schematic configuration illustrating an exemplary illuminating unit according to the present embodiment.

The illuminating unit 80 of the present embodiment includes a plurality of white light emitting diodes (hereinafter, referred to as LEDs) arranged as a light source. FIG. 3 illustrates a schematic configuration of the illuminating unit 80 according to an exemplary embodiment. The illuminating unit 80 includes a plurality of LED chips (hereinafter, simply referred to as an LED 81) arranged on a multilayer substrate 87 in a main scanning direction. In the embodiment, a sub scanning direction is defined as a conveying direction of the intermediate transfer body 27 (the direction of the arrow A of FIG. 1), and the main scanning direction is defined as a direction intersecting with the sub scanning direction.

In the present embodiment, the LED 81 is a white LED. Specifically, the LED 81 has a configuration in which a blue LED chip and a transparent resin containing a yellow fluorescent material are laminated. The yellow fluorescent material around the blue LED chip is excited by blue light emitted by the LED chip, thereby generating yellow fluorescent light. Accordingly, the blue light and the yellow light complementary to each other are combined (synthesized) to generate white light.

The CCD (Charge Coupled Device) image sensor 88 of the present embodiment has a function of photoelectrically converting an optical image, which is formed by an imaging lens 86 that optically reduces an optical image obtained from the half-rate carriage 78, and accumulating charges as R (red), G (green) and B (Blue) color signals (image signals). As an example, in the CCD image sensor 88 of the present embodiment, 3-row arrangement of one-dimensional line sensors for RGB colors is configured as 1 set. The CCD image sensor 88 backup-converts the light reflected from a sheet on a per pixel basis, and outputs RGB analog image signals.

The controlling unit 90 has a function of controlling an overall operation of the image reading apparatus 12. Further, the controlling unit 90 has a function of processing RGB color image signals from the CCD image sensor 88, and generating image data. The control unit 90 is connected to the controlling unit 40 and the image processing unit 42 of the image forming apparatus unit 14 to communicate control signals or read-out image data with each other.

Figure 4:
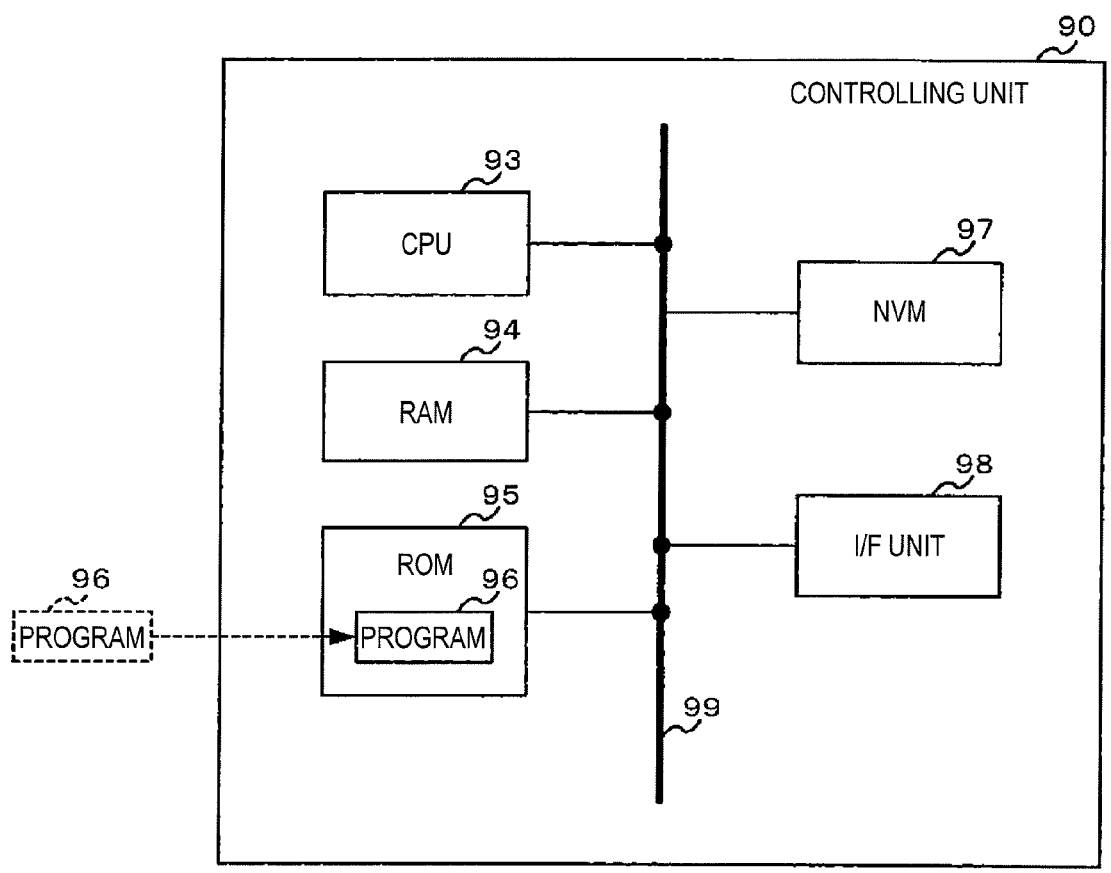
FIG. 4 is a schematic configuration illustrating an exemplary controlling unit according to the present embodiment.

A hardware configuration of the controlling unit 90 will be described below. FIG. 4 illustrates a schematic configuration of an exemplary controlling unit 90. The controlling unit 90 of the present embodiment includes a CPU 93, a RAM 94, a ROM 95, a Non Volatile Memory (NVM) 97, and an I/F unit 98. The CPU 93, the RAM 94, the ROM 95, the NVM 97, and the I/F unit 98 are connected through a bus 99 such as a control bus or a data bus to communicate information or the like with each other.

The CPU 93 has a function of executing a digital operation process according to a predetermined process program in processing an image signal generated by reading a sheet. The RAM 94 is used to secure a working area when a program 96 is executed by the CPU 93. The ROM 95 stores, for example, various setting values used in the process of the CPU 93, and the program 96 for an amplification factor changing process, which will be described below in detail. In the present embodiment, the program 96 is executed by the CPU 93 to perform an amplification factor changing process, which will be described below in detail. The NVM 97 is a flash memory or the like to which power is supplied by a battery to retain data even when power supply thereto is interrupted. The I/F unit 98 is used to control the input/output of signals to/from each component such as the controlling unit 40 or the image processing unit 42 of the image forming apparatus unit 14 connected to a signal processing unit 100.

Although the program 96 is illustrated as being prestored in the present embodiment, the present invention is not limited thereto. For example, the program 96 may be provided from an external device (not illustrated) and installed in the ROM 95. The program 96 may be transmitted through a network such as the Internet to the signal processing unit 100 and installed in the ROM 95 of the signal processing unit 100. The program 96 may be provided from an external storage medium such as DVD-ROM, flash memory, or USB and installed in the ROM 95.

Figure 5:
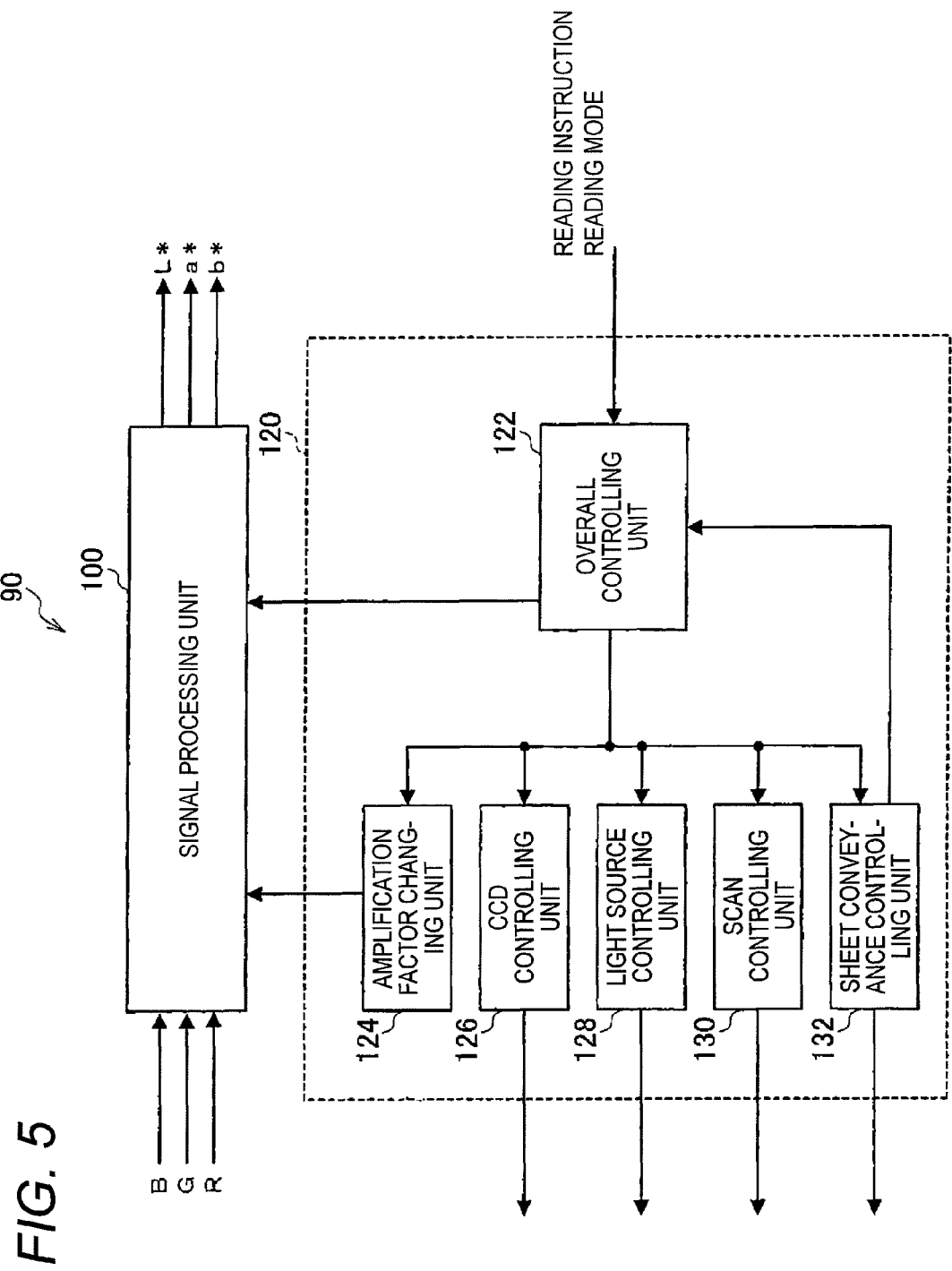
FIG. 5 is a functional block diagram illustrating an exemplary controlling unit according to the present embodiment.

Next, the functions of the controlling unit 90 according to an embodiment will be described in detail with reference to FIG. 5. FIG. 5 is a functional block diagram illustrating an example of the controlling unit 90.

Figure 6:
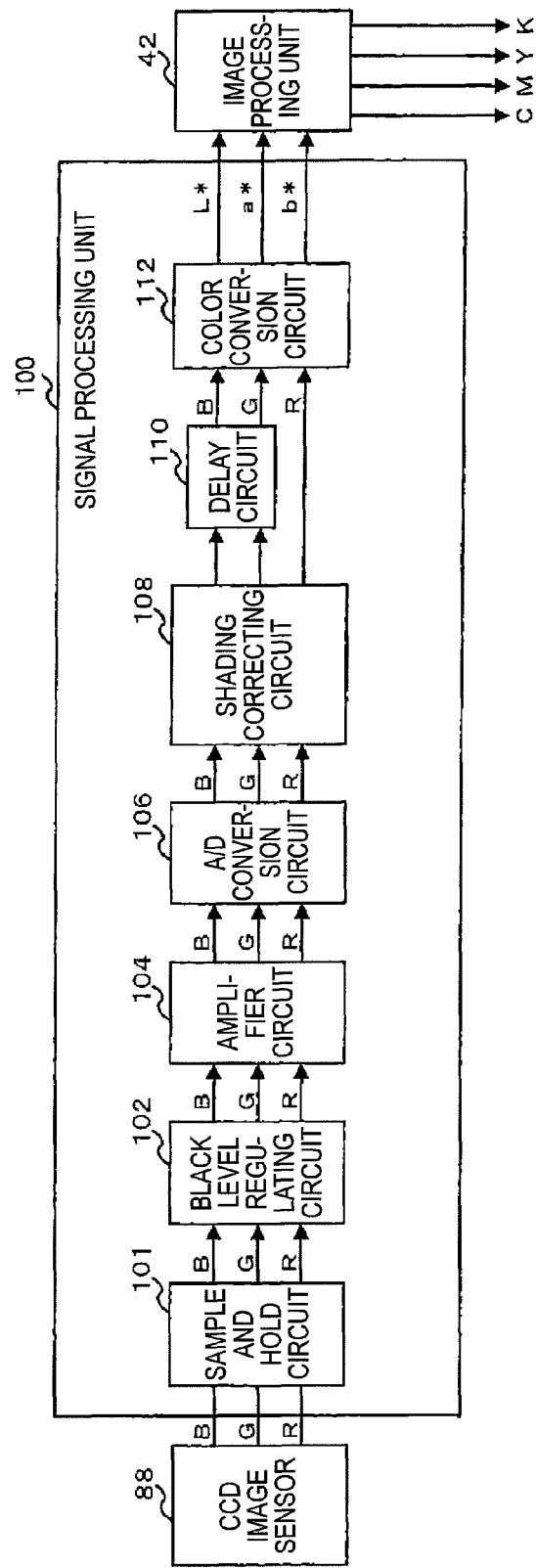
FIG. 6 is a block diagram illustrating an exemplary signal processing unit according to the present embodiment.

The controlling unit 90 includes a signal processing unit 100 and a device controlling unit 120. First, the signal processing unit 100 will be described with reference to FIG. 6. FIG. 6 is a block diagram illustrating an example of the signal processing unit 100 according to an embodiment.

As illustrated in FIG. 6, the signal processing unit 100 includes a sample and hold circuit 101, a black level regulating circuit 102, an amplifier circuit 104, an A/D (analog/digital) conversion circuit 106, and a shading correcting circuit 108.

The sample and hold circuit 101 has a function of sampling RGB analog image signals received from the CCD image sensor 88, and holding the same for a predetermined period. The black level regulating circuit 102 has a function of regulating the black level of the output corresponding to the black of a read-out sheet (hereinafter, also referred to as a read sheet) and the black level of the output of the image reading apparatus 12 to be identical (or substantially identical) to each other, with respect to the RGB analog image signals sampled-and-held by the sample and hold circuit 101. The amplifier circuit 104 has a function of amplifying the RGB analog image signals after the black level regulation. The A/D conversion circuit 106 has a function of A/D-converting the RGB analog image signals, amplified by the amplifier circuit 104, into RGB digital image data. The shading correcting circuit 108 has a shading correcting function of correcting a non-uniformity of read-out output caused by the illuminating unit 80 or the CCD image sensor 88 and regulating the black level of the read-out sheet and the black level of the output of the image reading apparatus 12 to be identical (or substantially identical) to each other, with respect to the RGB image data converted by the A/D conversion circuit 106.

A delay circuit 110 has a function of correcting the reading time difference between the respective image data caused by the position deviation of the RGB one-dimensional line sensors that constitute the CCD image sensor 88 in the sub scanning direction, on the basis of the R image data.

A color conversion circuit 112 has a color conversion function of converting RGB image data of an RGB color space (a first color space: a device-dependent color space) into L*, a* and b* image data of an L*a*b* color space (a second color space: a device-independent color space) that is a luminance-color difference color space by using color conversion parameters (a color conversion factor group). Herein, for example, the color conversion parameter refers to ones that specifies the correspondence relationship between RGB image data and L*, a* and b* image data when converting RGB image data of an RGB color space into L*, a* and b* image data of an L*a*b* color space. For example, the color conversion process may use a matrix operation or a multi-dimensional (three-dimensional) look-up table (DLUT (Direct Look-Up Table)), but the present invention is not limited thereto.

The L*, a* and b* image data color-converted by the color conversion circuit 112 are transmitted to the image processing unit 42 of the image forming apparatus unit 14 to be subjected to a color conversion process to CMYK image data of a CMYK color space (a device-dependent color space) that is an output color space. The image processing unit 42 that performs a color conversion process to CMYK image data of the output color space may be installed in the image reading apparatus 12.

In the signal processing unit 100, the RGB analog image signals received from the CCD image sensor 88 are sampled by the sample and hold circuit 101, the black levels thereof are regulated by the black level regulating circuit 102, and the regulated signals are amplified to a predetermined signal level by the amplifier circuit 104. The amplified RGB analog image signals are A/D-converted by the A/D conversion circuit 106 to generate RGB digital image data. With respect to the RGB image data, the shading correcting circuit 108 performs correction processing in which the RGB image data are corresponded to the light quantity distribution characteristics of an optical system or the sensitivity change of the one-dimensional line sensors of the CCD image sensor 88, on the basis of image data read from the white reference plate 72. After the position deviation in the sub scanning direction is corrected by the delay circuit 110, the RGB image data are converted by the color conversion circuit 112 into L*, a* and b* image data of an L*a*b* color space.

Next, the device controlling unit 120 will be described. The device controlling unit 120 of the present embodiment includes an overall controlling unit 122, an amplification factor changing unit 124, a CCD controlling unit 126, a light source controlling unit 128, a scan controlling unit 130, a sheet conveyance controlling unit 132.

The overall controlling unit 122 has a function of controlling sheet reading on the basis of the reading mode indicated by the U/I unit 48 or the like, and controlling an overall operation of the image reading apparatus 12. In the present embodiment, the reading mode is the mode of reading a sheet by the image reading apparatus 12. The reading mode includes the reading mode of reading a sheet placed on the first platen glass 70 by a user, and the reading mode of reading a sheet that is placed on the sheet table 60 and conveyed by the automatic sheet feeding unit 50. Further, for example, other reading modes may include sheet enlargement/reduction, color/black & white, and resolution or the like, although the present invention is not limited thereto.

The amplification factor changing unit 124 has a function of setting the amplification factor that amplifies the RGB image signals in the amplifier circuit 104 of the signal processing unit 100, in accordance with a turn-off time of the LED 81 that is a light source (which will be described below in detail). The CCD controlling unit 126 has a function of controlling an operation of the CCD image sensor 88. The light source controlling unit 128 has a function of controlling the LED 81 (the illuminating unit 80) in accordance with the reading timing of a sheet. In the present embodiment, the light source controlling unit 128 has a function of controlling the turn-on and off of the LED 81 in accordance with the reading mode (reading time) of a sheet, on the basis of the instruction of the overall controlling unit 122. The scan controlling unit 130 has a function of controlling a scan operation by controlling the moving speed of the full-rate carriage 76 and the half-rate carriage 78. The sheet conveyance controlling unit 132 has a function of controlling an operation of the automatic sheet feeding unit 50. Control signals are output respectively from the CCD controlling unit 126, the light source controlling unit 128, the scan controlling unit 130, and the sheet conveyance controlling unit 132 to the automatic sheet feeding unit 50 and the image read processing unit 52, and a sheet reading operation is performed on the basis of the control signals.

In the image reading apparatus 12 of the present embodiment, when the reading mode of reading a sheet placed on the first platen glass 70 is instructed, the controlling unit 40 of the image forming apparatus unit 14 instructs the device controlling unit 120 to read a sheet loaded on the first platen glass 70, on the basis of the user's manipulation instruction from the U/I unit 48 of the image forming apparatus unit 14.

Upon receiving a reading instruction of the sheet loaded on the first platen glass 70 from the controlling unit 40 of the image forming apparatus unit 14, the controlling unit 90 moves the full-rate carriage 76 and the half-rate carriage 78 in the scanning direction (the direction of an arrow C of FIG. 2). The controlling unit 90 turns on the illuminating unit 80 of the full-rate carriage 76 to irradiate light onto a sheet surface. By this irradiation, the reflected light from the sheet is guided to the imaging lens 86 through the first mirror 82, the second mirror 85, and the third mirror 84. The light guided to the imaging lens 86 forms an image on the light receiving surface of the CCD image sensor 88. The CCD image sensor 88 simultaneously performs processing for one line per each of RGB colors. The line-direction reading is performed by scanning across the entire sheet size, thereby completing the read-out for one page of sheet.

The RGB image signals obtained by the CCD image sensor 88 as described above are transmitted to the controlling unit 90, and L*, a* and b* image data are generated by the signal processing unit 100. The generated L*, a* and b* image data are output to the image processing unit 42.

Meanwhile, in the image reading apparatus 12, when the reading mode of reading a sheet placed on the sheet table 60 is instructed, the controlling unit 40 of the image forming apparatus unit 14 instructs the controlling unit 90 to read the sheet loaded on the sheet table 60, on the basis of the user's manipulation instruction from the U/I unit 48 of the image forming apparatus unit 14.

Upon receiving a reading instruction of the sheet placed on the sheet table 60 from the controlling unit 40 of the image forming apparatus unit 14, the controlling unit 90 conveys the placed sheet to a reading position of the second platen glass 74 along the sheet conveying path 61. At this point, the full-rate carriage 76 and the half-rate carriage 78 are set to stop at the location of a solid line illustrated in FIG. 2. Then, the illuminating unit 80 of the full-rate carriage 76 is turned on to irradiate light onto a sheet surface. Accordingly, the reflected light from the sheet adhered closely to the second platen glass 74 by the platen roller 67 is guided to the imaging lens 86 through the first mirror 82, the second mirror 85, and the third mirror 84. The light guided to the imaging lens 86 forms an image on the light receiving surface of the CCD image sensor 88. The CCD image sensor 88 simultaneously performs processing for one line per each of RGB colors. A one page of sheet is read out by passing the entire sheet through the reading position of the second platen glass 74.

The RGB image signals obtained by the CCD image sensor 88 are transmitted to the controlling unit 90, and L*, a* and b* image data are generated by the signal processing unit 100. The generated L*, a* and b* image data are output to the image processing unit 42.

As such, in the image reading apparatus 12 of the present embodiment, the scan operation is different depending on the reading mode. Therefore, the sheet reading time is different depending on the reading mode. For example, in the reading mode of reading out the sheet placed on the first platen glass 70 by the user, the sheet (image) reading speed is slow, as compared with the reading mode of reading the sheet using the automatic sheet feeding unit 50. Therefore, the reading time is lengthened. As such, if the reading time is lengthened, the time for the CCD image sensor to accumulate the charges is also lengthened according to the reading time. An amount of exposure is increased, and the charges accumulated in the CCD image sensor 88 are saturated. Thus, the accumulated charges may exceed the saturated output voltage of the CCD image sensor 88. Due to the change of the LED 81, the amount of exposure is increased, and the charges accumulated in the CCD image sensor 88 are saturated. Thus, the accumulated charges may exceed the saturated output voltage of the CCD image sensor 88. Therefore, if the sheet reading speed becomes lower than the predetermined speed, light received by the CCD image sensor 88 exceeds the saturated exposure amount to reach an amount (saturated charge amount) that the charges accumulated on the CCD image sensor become saturated. In this case, a normal reading operation for a sheet may become difficult.

Therefore, in the present embodiment, the sheet reading speed is set based on the saturated charge amount of the CCD image sensor 88. If the reading mode which is lower than the predetermined reading speed is instructed, the turn-on time is controlled to set the period during which the LED 81 of the illuminating unit 80 as the light source is turned off, so that the charges accumulated in the CCD image sensor 88 do not reach the saturated charge amount. In the image reading apparatus 12, color reading is slower in the reading speed than white/black reading. A case that the enlargement/reduction is performed is slower in the reading speed than a case that the enlargement/reduction is not performed. As the resolution is increased, the reading speed becomes slower.

In the present embodiment, in the case of the reading mode in which the sheet is read out using the automatic sheet feeding unit 50, the charges accumulated in the CCD image sensor 88 do not reach the saturated charge amount. Therefore, if the reading time of the reading mode is longer than that of the reading mode of reading out the sheet placed on the first platen glass 70 by the user, the turn-on period is set.

When the LED 81 is turned off as described above, the amount of charges accumulated in the CCD image sensor 88 is decreased. Therefore, a smaller amount of charges than an amount of charges to be originally obtained (for example, an amount of charges when the turn-off period is not set) is accumulated in the CCD image sensor 88. By setting the turn-off period, the magnitude of the image signal acquired as such may be smaller. Therefore, the amplification factor changing unit 124 of the image forming apparatus 12 of the present embodiment changes the amplification factor of the amplifier circuit 104, which amplifies the image signal to become an image signal of a predetermined magnitude, according to the turn-off period. That is, when the turn-off period is set, the amplification factor of the amplifier circuit 104 is increased, as compared to the case where the turn-on period is not set, so as to amplify the lower electrical signal according to the turn-off period. The electrical signal of the predetermined magnitude may be an electrical signal based on the amount of charges accumulated when the turn-off period is not set. Although it is not specifically limited, it is preferable to predetermine the electrical signal such that the magnitude of the image signal becomes constant irrespective of the turn-off period.

In the amplifier circuit 104 of the present embodiment, the amplification factor (initial value) is preset, which is based on the image signal that is generated by reading out the reflected light from the white reference plate 72, for example, when power is supplied to the image reading apparatus 12. If the turn-off period is not set, the amplification factor of the amplifier circuit 104 is the preset amplification factor (initial value). If the turn-off period is set, the amplification factor is changed as described above.

Figure 7:
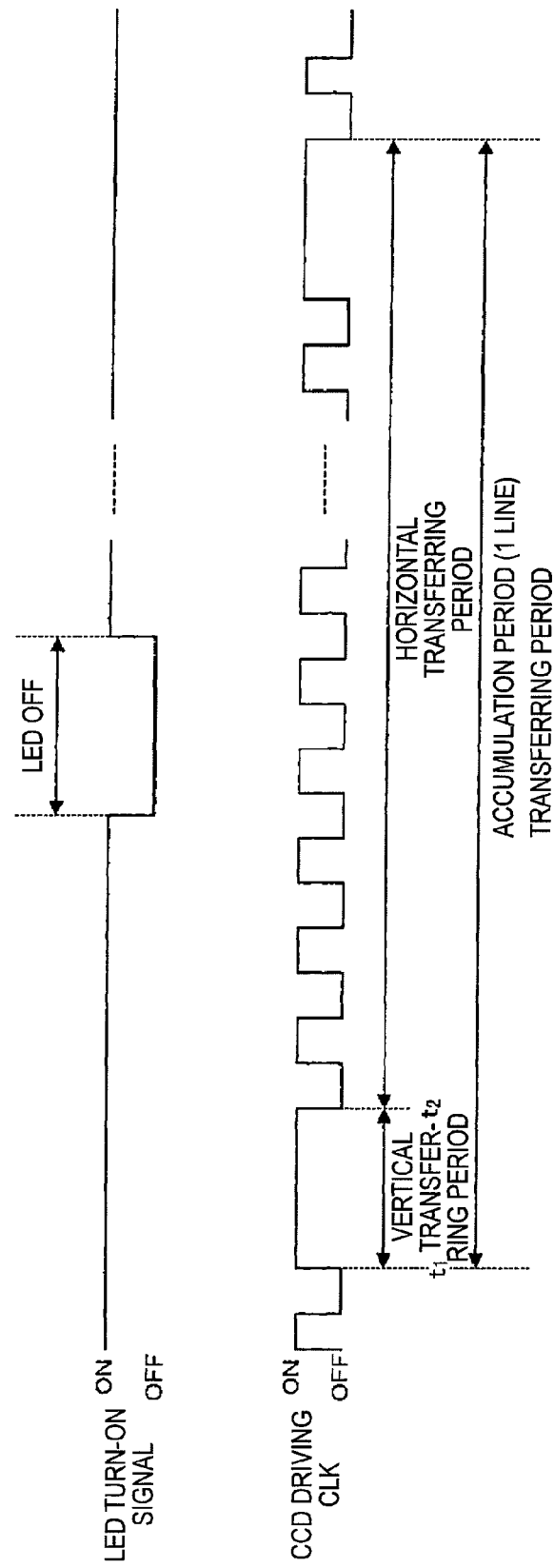
FIG. 7 is a timing chart illustrating a control signal used by a CCD controlling unit to operate a CCD image sensor and a control signal used by a light source controlling unit to operate an LED, according to the present embodiment.

Herein, the operations of the LED 81, which is the light source, of the illuminating unit 80, and the CCD image sensor 88 will be described in detail. FIG. 7 is a timing chart illustrating the control signal used by the CCD controlling unit 126 to operate the CCD image sensor 88 and the control signal used by the light source controlling unit 128 to operate the LED 128. In FIG. 7, the upper part is a timing chart of the control signal used by the light source controlling unit 128 to operate the LED 81, and the lower part is a timing chart of the control signal (CCD driving clock CLK) used by the CCD controlling unit 126 to operate the CCD image sensor 88.

In the present embodiment, the transferring period of the image information for one line in the main scanning direction is set as the charge accumulating period of the CCD image sensor 88, and the transferring period includes a vertical transferring period and a horizontal transferring period.

Figure 8:
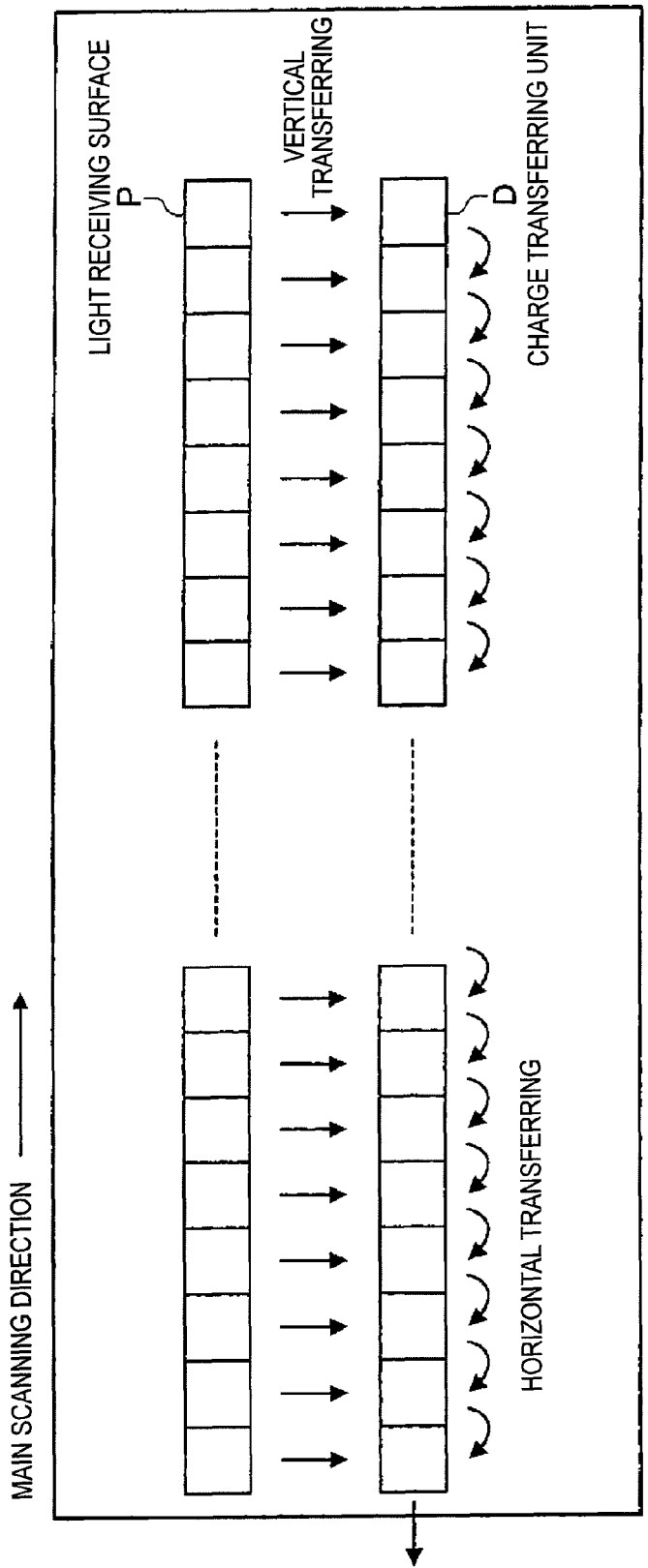
FIG. 8 is a diagram illustrating an operation of transferring a photoelectric converted charge in a CCD image sensor according to the present embodiment.

Herein, a vertical transferring and a horizontal transferring in a CCD image sensor 88 will be described. FIG. 8 is a diagram illustrating an operation of transferring a photoelectric converted charge in a CCD image sensor 88.

In the CCD image sensor 88, photo diodes P are arranged in rows on a light receiving surface on which the light reflected by the sheet is received. In the present embodiment, the photo diodes P corresponding to RGB colors are arranged in three rows so that the image recorded in the sheet can be read in RGB colors. For example, 7500 photo diodes P are arranged for one row. In FIG. 8, one row among the three rows is illustrated as an example.

The photo diodes P in FIG. 8 are arranged in one row in the main scanning direction, and one photo diode P corresponds to one pixel when the image reading apparatus 12 reads out the sheet. If light is irradiated onto the photo diodes P, photoelectric conversion occurs so that charges are accumulated in the photo diodes P. The amount of accumulated charges is proportional to the accumulating time (accumulating period) and the amount of irradiated light. In the photo diodes P, the charges are accumulated for a predetermined accumulating period and output the accumulated charges as an electrical signal. At this time, the general CCD image sensor 88 performs the vertical transmission and the horizontal transferring to output the charges (electrical signal). The charges accumulated in the photo diodes P are vertically transferred and then sent to a charge transferring unit D. The charge transferring unit D is a semiconductor device including a CCD (Charge Coupled Device). The vertically transferred charges are horizontally transferred sequentially from the charge transferring unit D so that the charges are output as an image signal for one line.

First, in the vertical transferring period shown in FIG. 7, the charges accumulated in the photo diodes P are vertically transferred from the photo diodes P to the charge transferring unit D. Then, in the horizontal transferring period shown in FIG. 7, the horizontal transferring is performed in the charge transferring unit D. In the horizontal transferring, the charges are horizontally transferred sequentially on per pixel basis according to on/off of a CCD driving clock CLK until all charges for one line are horizontally transferred. While the vertical transferring and the horizontal transferring are performed, the charges for next one line are photoelectric converted and accumulated in the photo diodes P.

In the present embodiment, as described above, in the case of the reading mode in which the reading time is long, an LED turn-on signal is switched from on to off during the accumulating period of the CCD image sensor 88, as illustrated in the timing chart of the upper part of FIG. 7, and the turn-off period of the LED 81 (see LED off in FIG. 7) is set. Therefore, it is possible to prevent the charges accumulated in the CCD image sensor 88 from reaching the saturated charge amount.

The turn-off period of the LED 81 is preferably set to be fallen within the horizontal transferring period of the CCD image sensor 88. In the present embodiment, the LED 81 is used as the light source. However, before and after turning on and off the LED, the color tint of the light emitted from the LED is easily changed. Therefore, if the turn-off period of the LED 81 is set to be fallen within the vertical transferring period of the CCD image sensor 88, the sheet may not be normally read out due to the influence of the color tint change of the LED.

Likewise, within a predetermined time before and after a starting time (see time t1 in FIG. 7) and an ending time (see time t2 in FIG. 7) of the vertical transferring period of the CCD image sensor 88, it is preferable that the LED 81 is not turned on and off. That is, it is preferable that the turn-off period of the LED 81 is set while avoiding a period (time) at which the color tint of the LED 81 is easily changed. As such, a predetermined time which falls before and after a starting time and an ending time and where the turn-off time of the light source 81 is not set can be previously set in accordance with a property of the LED 81.

Figure 9:
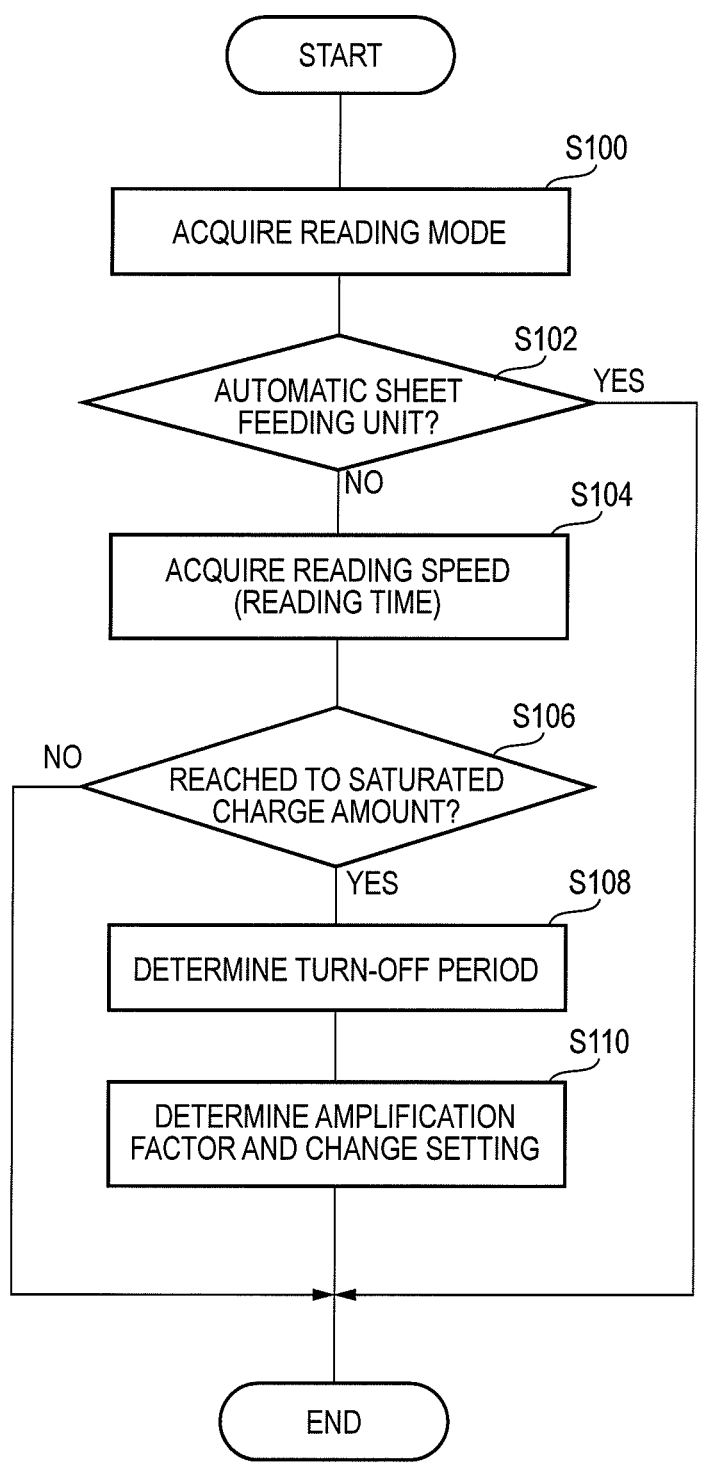
FIG. 9 is a flow chart illustrating an exemplary amplification factor changing process according to the present embodiment.

Next, an amplification factor changing process in the image reading apparatus 12 of the present embodiment will be described. FIG. 9 is a flow chart illustrating an example of an amplification factor changing process according to an embodiment. The amplification factor changing process is executed by the U/I unit 48, for example, when a sheet reading instruction is received from a user. As described above, an amplification factor of an initial value is already set in the amplifier circuit 104.

At step S100, the overall controlling unit 122 takes a reading mode. At next step S102, it is determined whether the acquired reading mode is reading a sheet using the automatic sheet feeding unit 50 or reading a sheet placed on the first platen glass 70. In the case of reading the sheet using the automatic sheet feeding unit 50, the image reading apparatus 12 does not change the amplification factor because the charges accumulated in the CCD image sensor 88 do not reach a saturated charge amount. For this reason, if the reading mode is reading the sheet using the automatic sheet feeding unit 50, this process is ended. In this case, the amplifier circuit 104 amplifies an image signal input from the black level regulating circuit 102 at a preset amplification factor (initial value) and outputs the amplified image signal to the A/D conversion circuit 106.

Meanwhile, if the reading mode is reading the sheet placed on the first platen glass 70, the process proceeds to step S104. At step S104, the overall controlling unit 122 acquires a reading speed (reading time) based on the reading mode. For example, a correspondence relationship of the reading mode and the reading speed (reading time) is previously accumulated in a storage unit (not shown) such as HDD, and the reading speed (reading time) is acquired based on the correspondence relationship.

At next step S106, based on the acquired reading speed (reading time), it is determined whether the charges accumulated in the CCD image sensor 88 reach the saturated charge amount. For example, as described above, if the acquired reading speed (reading time) is slower than the predetermined reading speed (reading time), it is determined that the charges reach the saturated charge amount. If it is determined that the charges do not reach the saturated charge amount, this process is ended. In this case, the amplifier circuit 104 amplifies an image signal input from the black level regulating circuit 102 at a preset amplification factor (initial value) and outputs the amplified image signal to the A/D conversion circuit 106.

Meanwhile, if it is determined that the charges reach the saturated charge amount, the process proceeds to step S108. At step S108, a turn-off period of the LED 81 is determined based on the reading speed (reading time). For example, a correspondence relationship of the reading speed (reading time) and the turn-off period is previously accumulated in a storage unit (not shown) such as HDD, and the turn-off period of the LED 81 is determined based on the correspondence relationship. In this manner, if the turn-off period is determined, the light source controlling unit 128 controls a turn-on of the LED 81 such that the LED 81 becomes an off state during the turn-off period.

At next step S110, the amplification factor changing unit 124 determines an amplification factor based on the determined turn-off time, and changes the amplification factor of the amplifier circuit 104 to the amplification factor determined from the initial value. Then, this process is ended.

As described above, the image reading apparatus 12 of the image forming apparatus 10 of the present embodiment includes a signal processing unit 100 having an amplifier circuit 104 which amplifies an electrical signal according to the charge accumulated in the CCD image sensor 88 due to the reflected light obtained from the sheet, and the device controlling unit 120 which has the overall controlling unit 122, the amplification factor changing unit 124, and the light source controlling unit 128. According to the sheet reading mode, in the case of the reading mode where the reading speed is slow and the reading time is long so that the charges accumulated by the CCD image sensor 88 reach the saturated charge amount, the overall controlling unit 122 instructs the light source controlling unit 128 to set the turn-off period of the LED 81 to be fallen within a horizontal transferring period of the CCD image sensor 88. Based on the instruction, the light source controlling unit 128 controls the turn-on of the LED 81. In case of setting the turn-off period, the amplification factor changing unit 124 determines the amplification factor of the amplifier circuit 104, based on the turn-off period, such that the image signal amplified in the amplifier circuit 104 becomes an image signal having a predetermined magnitude. Then, the amplification factor changing unit 124 changes the amplification factor of the amplifier circuit 104 to the determined amplification factor.

In particular, in the present embodiment, in the case of the reading mode of reading the sheet placed on the first platen glass 70, the reading speed is slow and the reading time becomes long, as compared with the reading mode of reading the sheet using the automatic sheet feeding unit 50. Therefore, the turn-off period of the LED 81 is set and the amplification factor of the amplifier circuit 104 is changed so as to supplement the output of the image signal damaged by the setting of the turn-off period.

As such, in the present embodiment, in the case of the reading mode in which the charges of the CCD image sensor 88 reach the saturated charge amount, the turn-off period of the LED 81 is set and the amplification factor of the amplifier circuit 104 is changed so as to supplement the output of the image signal damaged by the setting of the turn-off period.

Therefore, even when the reading speed is slow and the reading time is long, the amount of the accumulated charge does not reach the saturated charge amount, and a constant image signal can be obtained. As a result, the quality of the image formed by the image forming apparatus 10 is improved.

The configuration, operation, and amplification factor changing process of the image forming apparatus 10, the image reading apparatus 12, the image forming apparatus unit 14, and or the like, which has been described in the present embodiment, are exemplary and it is apparent that they may be modified according to situations, without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus, comprising:
   a reading unit that receives a reflected light from a sheet onto which a light is irradiated from a light source, that converts the received light into an image signal, and that accumulates a charge corresponding to the image signal in accordance with a reading time of the sheet;
   a controlling unit that controls the light source to be turned off in accordance with a reading mode of the sheet so that an amount of the charge accumulated by the reading unit does not reach a saturated amount; and
   a changing unit that changes an amplification factor of an amplifying unit in accordance with a turn-off time of the light source so as to amplify the image signal to a predetermined level when the controlling unit controls the light source to be turned off, the amplifying unit which amplifies the image signal at a predetermined amplification factor.

2. The image reading apparatus of claim 1,
   wherein the reading mode includes reading a sheet placed on a reading table by a user and reading a sheet conveyed by a sheet feeding unit, and
   the controlling unit controls the light source to be turned off in a case of reading the sheet placed on the reading table by the user.

3. The image reading apparatus of claim 1,
   wherein the reading mode includes reading a sheet conveyed by a sheet feeding unit, and
   the controlling unit controls the light source to be turned off when a reading time of another reading mode is longer than a reading time for reading the sheet conveyed by the sheet feeding unit.

4. The image reading apparatus of claim 1,
   wherein the reading unit includes a semiconductor device which outputs the charge accumulated by using a charge coupled device as the image signal by vertically and horizontally transferring the charge; and
   the controlling unit controls the light source not to be turned off for predetermined times before and after a start and an end of a vertical transferring period of the charge.

5. The image reading apparatus of claim 1,
wherein the reading unit includes a semiconductor device which outputs the charge accumulated by using a charge coupled device as the image signal by vertically and horizontally transferring the charge; and
the controlling unit controls the light source to be turned off for a horizontal transferring period of the charge.

6. An image forming apparatus, comprising:
the image reading apparatus according to claim 1 that reads the reflected light from the sheet onto which the light is irradiated from the light source and that outputs an image signal corresponding to the read reflected light; and
an image forming unit that forms an image based on the image signal output from the image reading apparatus.

7. A non-transitory computer-readable medium storing a program that causes a computer to execute image reading processing, the image reading processing comprising:
controlling a light source to be turned off in accordance with a reading mode of a sheet so that an amount of an accumulated charge does not reach a saturated amount, the charge being generated by receiving a reflected light from the sheet onto which a light is irradiated from the light source, by converting the received light into an image signal, and by accumulating the charge corresponding to the image signal in accordance with a reading time of the sheet; and
changing an amplification factor for the image signal in accordance with a turn-off time of the light source so as to amplify the image signal to a predetermined level when the light source is controlled to be turned off, the image signal being amplified at a predetermined amplification factor.

8. An image reading apparatus, comprising:
a light source that outputs light;
a reading unit that converts reflected light into an image signal, and accumulates, according to a reading speed, a charge corresponding to the image signal;
a controlling unit that controls the light source to be turned off in order to prevent the accumulated charge from reaching a saturated amount; and
a changing unit that, in response to the controlling unit controlling the light source to be turned off, changes an amplification factor from a first value to a second value in accordance with a time period that the light source is turned off, wherein the amplification factor is used to amplify the image signal to a predetermined level.

* * * * *